J. L. HOGAN, Jr.
OSCILLATING CURRENT METER.
APPLICATION FILED MAY 16, 1912.

1,152,632.

Patented Sept. 7, 1915.
2 SHEETS—SHEET 1.

WITNESSES:
Fred P. Staub
Jo. Baily Brown

John L. Hogan Jr., INVENTOR,
By F. W. H. Clay
Atty.

J. L. HOGAN, Jr.
OSCILLATING CURRENT METER.
APPLICATION FILED MAY 16, 1912.

1,152,632.

Patented Sept. 7, 1915.
2 SHEETS—SHEET 2.

UNITED STATES PATENT OFFICE.

JOHN L. HOGAN, JR., OF NEW YORK, N. Y., ASSIGNOR, BY MESNE ASSIGNMENTS, TO SAMUEL M. KINTNER, OF PITTSBURGH, PENNSYLVANIA, AND HALSEY M. BARRETT, OF BLOOMFIELD, NEW JERSEY, RECEIVERS.

OSCILLATING-CURRENT METER.

1,152,632. Specification of Letters Patent. Patented Sept. 7, 1915.

Application filed May 16, 1912. Serial No. 697,654.

*To all whom it may concern:*

Be it known that I, JOHN L. HOGAN, Jr., a citizen of the United States, residing at New York, N. Y., have invented certain new and useful Improvements in Oscillating-Current Meters, of which the following is a specification.

My invention relates generally to electric measuring instruments, but more especially to means for measuring the wave lengths, frequencies, capacities, inductances and couplings, etc., in dealing with the currents employed in wireless telegraphy and the like.

The primary object is to devise a more convenient, accurate and efficient meter for these quantities, all of which I include under the term "wave meter".

I have illustrated the invention by diagrams and otherwise in the accompanying drawing wherein—

Figure 1:
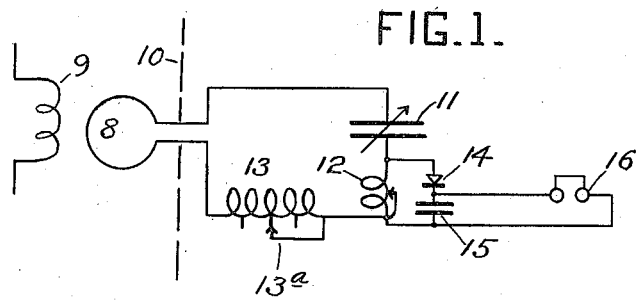
Figure 2:
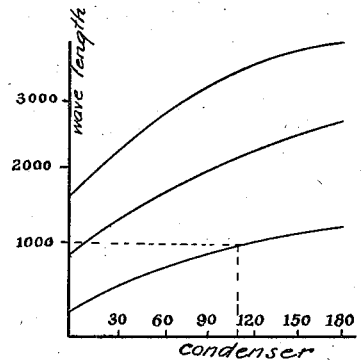
Figure 3:
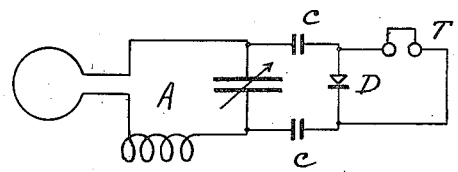
Figure 4:
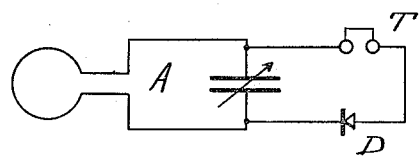
Figure 5:
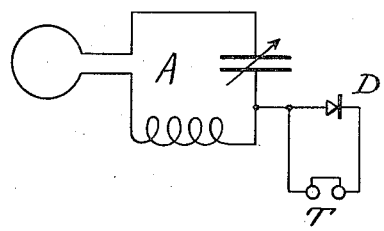
Figure 6:
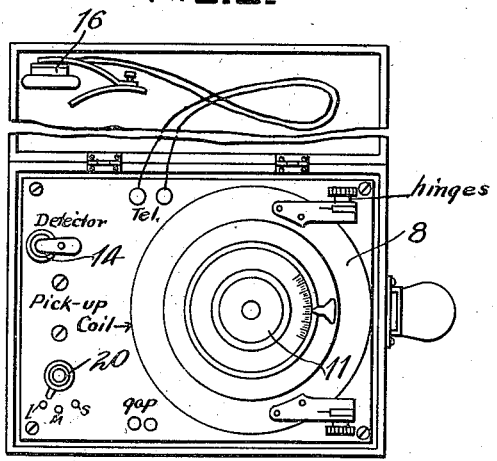
Figure 7:
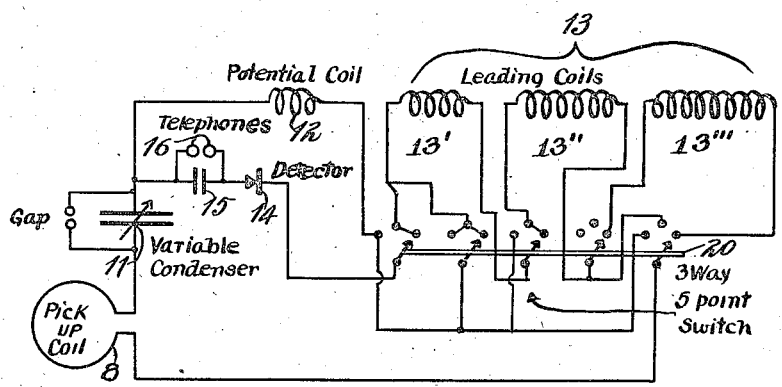

Figure 1 is an electrical diagram of a measuring instrument according to my invention. Fig. 2 represents the calibration curves of the same, and Figs. 3, 4 and 5 are diagrams to illustrate the principle of resonant measurement with the effects of various connections. Fig. 6 is a plan view of a commercial embodiment of a wave meter constructed according to my invention, and Fig. 7 is the wiring diagram of the same.

The invention, and its relation to the prior art is best explained by considering the application of resonant circuits to the measurement of high frequency current characteristics generally. The wave length corresponding to oscillations in a persistent circuit containing effective capacity C, and inductance L, is equal to $$K\sqrt{CL},$$

K being a constant quantity dependent upon the units employed.

The frequency of oscillation $$n = \frac{1}{2\pi\sqrt{CL}}$$

and the time period T is $$2\pi\sqrt{CL},$$

C and L being in the proper units. If a circuit having capacity $C_1$ and inductance $L_1$ is in oscillation, it will induce the largest possible sympathetic current in another neighboring circuit when the latter circuit has its capacity $C_2$ and inductance $L_2$ adjusted so that their products are equal to the like product in the first circuit: that is $C_1 L_1 = C_2 L_2$. Which is another way of saying that the greatest possible amount of energy is transferred when the circuits are in resonance with each other. Of course the period or wave length of an oscillating circuit is merely the square root of the product of effective inductance by effective capacity when suitable units are used; but these quantities are difficult to measure directly and therefore they are measured by the relations of a known circuit according to the equation last above. If the measuring circuit has a current indicator, a known fixed inductance and a known variable capacity, being near another circuit carrying oscillations and the measuring circuit's capacity be varied until the current in that circuit is a maximum, then the frequency of the circuit to be measured may be computed from the resonance values. To save the labor of repeated calculations, the curve showing the relation between settings on the condenser scale and the wave length or frequency may be plotted and if the wave length is shown as a function of capacity, the curve takes the form indicated in Fig. 2 of the drawing, where the abscissa represents the capacity and the ordinate represents wave length. On account of the difficulty of constructing a variable condenser of sufficient variation in capacity to cover a large range of wave length with one value of inductance, it is desirable to provide two or three steps for the fixed inductance, in the measuring circuit. This is also desirable because the persistence of oscillation should never be allowed to fall below a moderate value. In Fig. 2, I show three curves which are respectively based upon the resonant values when the inductance has three different values, referred to in Fig. 7 as the "short", "medium" and "long" range of wave length. If the capacity had three fixed large steps of value and the inductance were closely variable, the curves would be similar.

In Fig. 1, I show a wave meter circuit adapted particularly for use with a current indicating instrument which will show the presence of small currents in the resonating circuit and yet neither it nor the inducing coil will influence the calibration. That is, the coupling coil 8, used to sympathetically take current from any other circuit as from the coil 9, is separated by shield 10 from the closed resonant calibrating circuit consisting of the adjustable condenser 11, and inductances 12 and 13. The screen 10 may be of any form adapted to protect the measuring circuit and coils from external fields of all kinds. The coil 13 may be made in three parts and the part 12 which is here used as a potential coil may be variable but should be a separate part of the inductance. The large variable condenser 11 is used to alter the electrical time period of the circuit 8, 11, 12, 13. Shunted across the small potential coil 12, I place a detector circuit which may consist of one of the well known current operated cumulatively acting good contact detectors, commonly called rectifiers, 14, and a fixed condenser 15, while the telephone receiver 16 is shunted either around the condenser 15 or the detector 14. It will be understood therefore that when the movable instrument including the coil 8 is brought in proximity to another circuit, we may get any desired amount of current by varying this coupling, and the detector 14 having been adjusted, the condenser 11 is moved until the loudest possible response is obtained in the telephone 16, whereupon the setting of the condenser to this resonant position is noted on the resonance curve of Fig. 2, corresponding to the proper setting of the pointer 13ª in Fig. 1, and the wave length or frequency is read off the calibration curve. In order to show the advantage of this arrangement, and indeed the function of the described apparatus, it may be well to refer to other possible arrangements. For example, it has been customary heretofore to place a hot wire ammeter in series in the closed circuit, in order to indicate the condition of resonance by maximum indication of current, but this, on account of the lack of sensitiveness of the ammeter, requires a close coupling with the circuit to be measured. To overcome this difficulty it has been proposed to employ a sensitive oscillation detector connected as in a receiving outfit for wireless telegraphy, but this draws energy from the closed circuit so rapidly that resonance will not be sharp and what is still worse variations in the detector influence the calibration of the resonance circuit.

It has been proposed to arrange matters as in Fig. 3, where the telephone T is connected to the resonant circuit A by way of very small condensers c c, which prevent energy from feeding too rapidly into the detector and since these condensers have less capacity than the detector itself, the variation of the detector may be neglected. This arrangement has the defect however, that energy reaching the detector circuit in other ways, as along the telephone cords, or from the body of the operator touching the apparatus, gives false indications. Again it has been proposed to rely upon the high impedance of the telephone to keep oscillatory current out of the detector circuit except in small quantities, as well as to prevent variations in the detector from effecting the calibration. This arrangement as shown in Fig. 4, meets with the difficulty that the current through the telephones is not limited by their high inductive resistance because the windings themselves possess considerable distributed capacity so that enough current passes to make the tuning quite broad or destroy the sharp resonance of the oscillating circuit. As shown in Fig. 5, it has also been proposed to use a single wire connection between the oscillating circuit A and the telephone circuit, the capacity of the detector and telephone being relied upon to draw in sufficient current; but even here this capacity will be varied by the movement of the operator's body near the circuit and affect the accuracy of measurement. It will be understood therefore that my scheme of eliminating these difficulties resides in obtaining high sensitiveness by the use of a detector; by drawing the energy from the resonant circuit at a slow rate by connection of the detector circuit across small potential coil 12, instead of in shunt to the main condenser; by connecting both terminals of the detector directly to the resonant circuit so as to minimize or eliminate transference to the detector circuit of energy which does not reach the resonant circuit, (which is improved by making the condenser 15 of large capacity, such as .04 MF, so that it is equivalent to a solid conductor for high frequencies); finally, the detector being in shunt only to the potential coil 12, changes in the detector will have practically no effect on the electrical constants of the tuned circuit 8, 11, 12, 13.

In the wiring diagram of Fig. 7, I show several values 13', 13'', 13''', of the coil 13 of Fig. 1, and of course it will be understood that other variations such as using the inductance instead of the capacity for the closely variable tuning element, may be made. The advantages of my invention flow largely from the connection of the responding instrument across only a portion of the inductance or capacity in the resonant circuit, by which I obtain a very persistent and sensitive and selective measuring circuit; in addition to which I prefer to use separate coils for inducing the current and for adjusting the oscillating circuit. In other words, I have provided a free and independent oscillating circuit for calibration.

Having thus described my invention and illustrated its use, what I claim is the following:

1. A wave meter comprising a closed resonating circuit, containing inductance and capacities, and an oscillation indicator circuit shunted around a portion of said inductance and containing an oscillation detector and a condenser in series, and an indicating instrument shunted around one of the elements of the said indicating circuit.

2. In a wave meter, a resonant circuit having a continuously variable tuning element, a tuning inductance variable by steps, and a potential coil, and a circuit containing a rectifier and condenser in series shunted around said potential coil.

3. In a wave meter, a resonant circuit having a continuously variable tuning element, a tuning inductance variable by steps, and a potential coil, a circuit containing a rectifier and condenser in series shunted around said potential coil, and connections to eliminate the effect of the coils not in use.

4. In a wave meter, a resonant circuit containing inductance and capacity, one of which is variable by small increments, and a potential coil, a circuit containing a rectifier and condenser in series shunted around said potential coil, and an instrument to indicate the rectified current connected to said last named circuit.

In testimony whereof I have hereunto signed my name in the presence of the two subscribed witnesses.

JOHN L. HOGAN, Jr.

Witnesses:
 E. D. FORBES,
 F. GUBING,